United States Patent
Connolly et al.

(10) Patent No.: US 8,636,554 B1
(45) Date of Patent: Jan. 28, 2014

(54) ICE RECOVERY DEVICE

(76) Inventors: John Patrick Connolly, Sausalito, CA (US); Joseph Patrick Farais, Oakland, CA (US)

( * ) Notice: Subject to any disclaimer, the term of this patent is extended or adjusted under 35 U.S.C. 154(b) by 242 days.

(21) Appl. No.: 12/816,364

(22) Filed: Jun. 15, 2010

(51) Int. Cl.
*B63C 9/00* (2006.01)
*B63C 9/32* (2006.01)

(52) U.S. Cl.
USPC .............................................. 441/80; 441/82

(58) Field of Classification Search
USPC .............. 441/80, 82; 114/362, 61.1; 182/127; 440/31
See application file for complete search history.

(56) References Cited

U.S. PATENT DOCUMENTS

| | | | | |
|---|---|---|---|---|
| 1,244,325 A * | 10/1917 | Hanlon | ............................ | 441/82 |
| 2,956,535 A * | 10/1960 | Hunt | ............................... | 440/30 |
| 3,515,243 A * | 6/1970 | Ellen, Jr. | ....................... | 182/68.1 |
| 4,295,236 A * | 10/1981 | Upchurch | ...................... | 114/357 |
| 5,421,757 A * | 6/1995 | Basiliere | .......................... | 441/39 |
| 5,427,557 A * | 6/1995 | Lunden, Sr. | ..................... | 441/82 |
| 7,121,226 B2 * | 10/2006 | Grimaldi | ........................ | 114/362 |
| 2006/0071435 A1 * | 4/2006 | Zwack | ........................ | 280/47.27 |

* cited by examiner

*Primary Examiner* — Stephen Avila

(57) ABSTRACT

A buoyant rescue device for retrieval of drowning victims, particularly those that have fallen through floating ice, in the configuration of a catamaran with an opening in the bow to allow a ladder structure to rotate into the water. The ladder is pivotally mounted to the center of the craft and is lowered into the water the so the victim can climb the ladder onto the craft, or if the victim is injured or too weak to do so, a rescuer can provide a downward force at the top of the ladder and lift the victim out, such as a teeter totter would operate. The centrally located pivot point alleviates most of the listing or tilting and potential capsizing that would occur if a person were to climb onto the edge of the boat or if rescuers were reaching into the water to retrieve the person.

1 Claim, 6 Drawing Sheets

ICE RECOVERY DEVICE

BACKGROUND OF THE INVENTION

1. Field of Invention

The invention relates to the field of a portable buoyant device for the recovery of persons from an ice-water environment such as a partially frozen lake as well as swampy, muddy, and open water environments.

2. Related Art

There are several devices in existence for the rescue or recovery of drowning victims in situations where they have fallen through the surface of the ice into a watery environment. Although time is of the essence in any water rescue, when a person is submerged in ice cold waters time becomes even more critical due to the possibility of hypothermia. It is important that the device be quickly deployable, that is does not require much assembly or set up. Another factor of the rescue process is the time that it takes responders to protect themselves before they attempt the rescue effort, which usually requires the donning of protective clothing such as a dry suit or the like.

To address these problem devices can be either manned or un-manned; the most common unmanned device is a lifesaver ring attached to a rope thrown towards the victim or variations thereof. While the most common type of manned device is either a boat or skiff structure that is directed towards the victim. The devices are either very complicated or bulky or extremely simple and do not functional well. There is a tradeoff between maneuverability, speed of deployment and stability.

SUMMARY OF THE INVENTION

The invention provides for a rescue device for a person that has fallen through thin ice as in a lake, for example, that is extremely stable and easily maneuverable. The invention comprises a series of pontoons in the configuration of a catamaran that is opened at the front section and connected at the rear. Between the front portions of the pontoons is a cantilevered ladder structure that is pivotally mounted to the center of the structure. The ladder can be rotated around the pivot point and therefore lowered into the water, so that the drowning victim can climb out of the water onto the craft, or in the event that the victim is injured or too weak to do so, a rescuer can provide a downward force at the opposite end of the ladder and lift the victim out, such as a teeter totter would operate. This force can be achieved by the rescuer's weight, a winch configuration, or a block and tackle. Because the pivot point is located in the center of the craft it alleviates most of the listing or tilting and potential capsizing that would occur if a person were to climb onto the edge of the boat. This danger is amplified if rescuers were reaching into the water to retrieve the person because of the uneven distribution of weight on the structure.

It is an object of the invention to provide a buoyant craft that is quickly deployable and very stable that can be either manned or unmanned capable of rescuing drowning victims whether they are mobile or not.

A further object of the invention is to be relatively lightweight for easy transportation to the crisis that is easily propelled either by individuals on the craft or by rescuers on the land or at the edge of the water.

A further object of the invention is to be very fast and maneuverable on a variety of surfaces ranging from liquid to solid and phases in between, such as would be encountered on a partially frozen lake or swampy area.

A further object of the invention is to be easily manufactured and relatively light weight from common or existing devices so that it can be economically manufactured and maintained.

BRIEF DESCRIPTION OF THE DRAWINGS

Taking the following specifications in conjunction with the accompanying drawings will cause the invention to be better understood regarding these and other features and advantages. The specifications reference the annexed drawings wherein.

Figure 1:
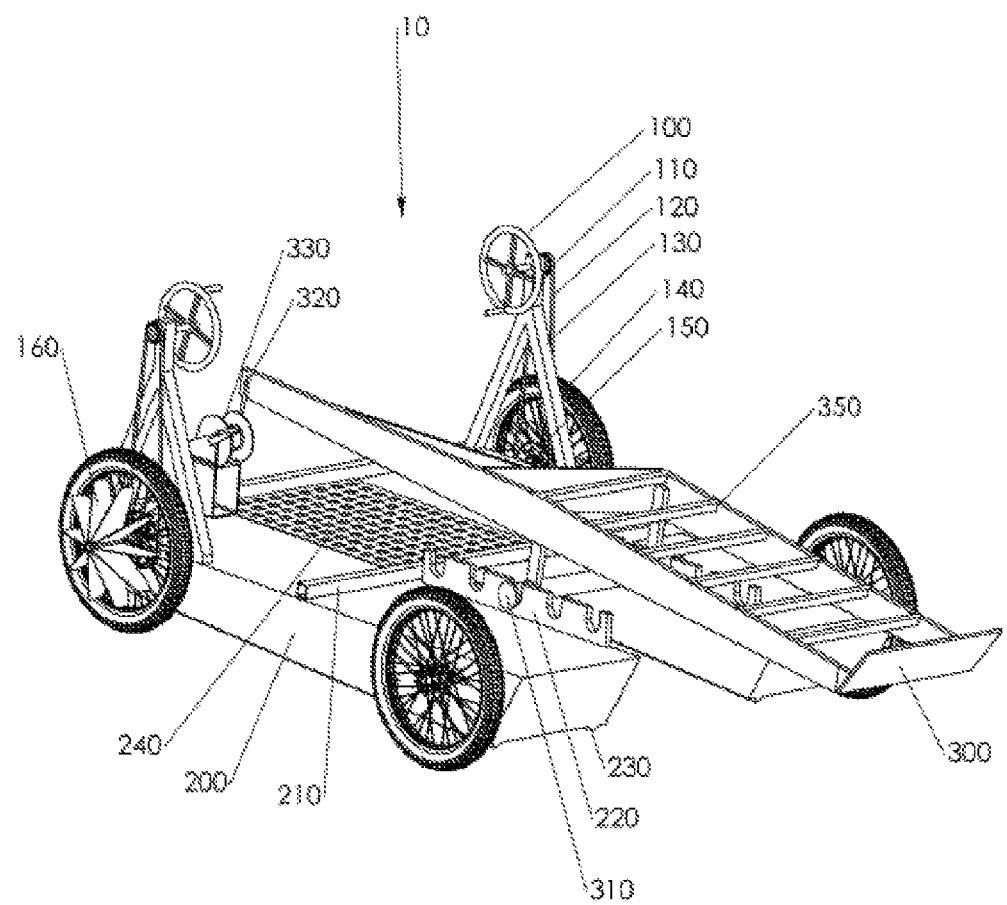
FIG. 1 is a front prospective view of the Ice Recovery Device.

| | DESCRIPTION OF THE DRAWING PARTS. |
|---|---|
| 10 | Ice Recovery Device |
| 100 | Rear wheel drive handle |
| 110 | Rear wheel upper drive sprocket |
| 120 | Connecting chain |
| 130 | Rear wheel drive support frame |
| 140 | Wheel and Tire |
| 150 | Rear wheel lower drive sprocket |
| 160 | Rear wheel paddles/fins |
| 200 | Pontoon |
| 210 | Pontoon connecting bar (front) |
| 220 | Pivot bar support (multiple - forward to rear locations) |
| 230 | Pontoon ridge |
| 240 | Deck |
| 300 | Articulating ladder bottom rung foot support |
| 310 | Articulating ladder pivot bar |
| 320 | Articulating ladder to support line connection tab (point) |
| 330 | Winch reel/block and tackle |
| 340 | Connecting Cable |
| 350 | Ladder |
| 400 | Victim |
| 410 | Rescuer |
| 600 | Telescopic pole handle |
| 610 | Telescopic pole |
| 620 | Cable guide eyelet |
| 630 | Control Cable |

DETAILED DESCRIPTION OF THE PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

FIG. 1 discloses a preferred embodiment of the present invention, a buoyant rescue craft or the ice recovery device and generally reference by the numeral 10 for the use of rescuing potential drowning victims from water in various phases. The craft 10 comprises of two pontoons 200 that are essentially enclosed boat hulls or rectangular shaped structures that may be made of a variety of materials, such as sheet metal, plastic, foam, fiberglass, or similar rigid material that is dimensioned to allow rescuers to stand on them and to float on water. In a preferred embodiment the pontoons 200 are hollow and have a relatively flat bottom section for stability reasons, as well as an interior side and an exterior side, the interior sides of two pontoons would be interconnected to form the catamaran structure.

It has been further contemplated in an embodiment to provide longitudinal ridges 230 on the base of the pontoons 200 running from the front to the rear of the pontoons. These act as wear point when the craft 10 is used on abrasive surfaces such as roads and the like and also act as skates to reduce the surface area in contact with the ice making the craft 10 easier to maneuver due to the decrease friction. These ridges 230 can be molded into the structure or externally mounted as a rail or weld bead.

The pontoons 200 are mounted parallel to each other and are connected by a connecting bar 210 in a catamaran configuration with a bow and a stern as found in water going vessels, so that there is a void or gap between the two pontoons 200 one forward of the connection point and one rear of the connection. The forward gap is of a width of sufficient dimensions to allow a human body to pass through, roughly a few to several feet wide. The gap is wide enough to allow a ladder 350 to pass through the gap and to be centrally pivotally mounted. That is mounted towards the center of gravity of the craft 10, so as to minimize tipping or capsizing when the ladder is used.

The ladder 350 is similar to traditional ladders in that it is comprised of rungs and rails and has a top and a bottom and may be telescopic or articulating for more compact storage and ease of deployment. In one embodiment the ladder 350 is modified so that one rail is longer than it's opposite and has no rungs on the top portion to allow rescue crew to access the victim easier.

The ladder 350 for is mounted on the midsection of the pontoons at a pivot point or in a seesaw configuration. The ladder has a top and a bottom, just as common ladders do, but at the bottom section, instead of an open rung there is a rectangular or elongated plate configuration that forms the bottom rung foot support 300 that is slightly angled so that it intersects with the ladder rail at an obtuse angle greater than 90 degrees, so that when the ladder 350 is retracted or laying flat on the craft the front end of the ladder serves as a plow or cattle catcher to prevent the craft from getting bogged down in the ice.

The rear gap is covered with a sufficiently strong material, such as canvas, expanded metal or grating to form a deck 240 that can allow rescuers to stand and work, but is lightweight and provides a non-slip surface, preferably self draining.

In one embodiment the craft 10 utilizes exterior mounted tires and wheels 140 to help the craft 10 traverse ground and hard surfaces, the wheels 140 are relatively large in diameter, similar to that of a bicycle in one embodiment, but they are mounted in an offset fashion, so that there is very little overhang under the craft 10, this prevents the wheels 140 from getting stuck in the mud or snow, while allowing the advantages and stability of a large diameter wheel when traversing hard surfaces. Different embodiments have been contemplated using two or more wheels 140 dependant on the size of the craft 10.

Figure 2:
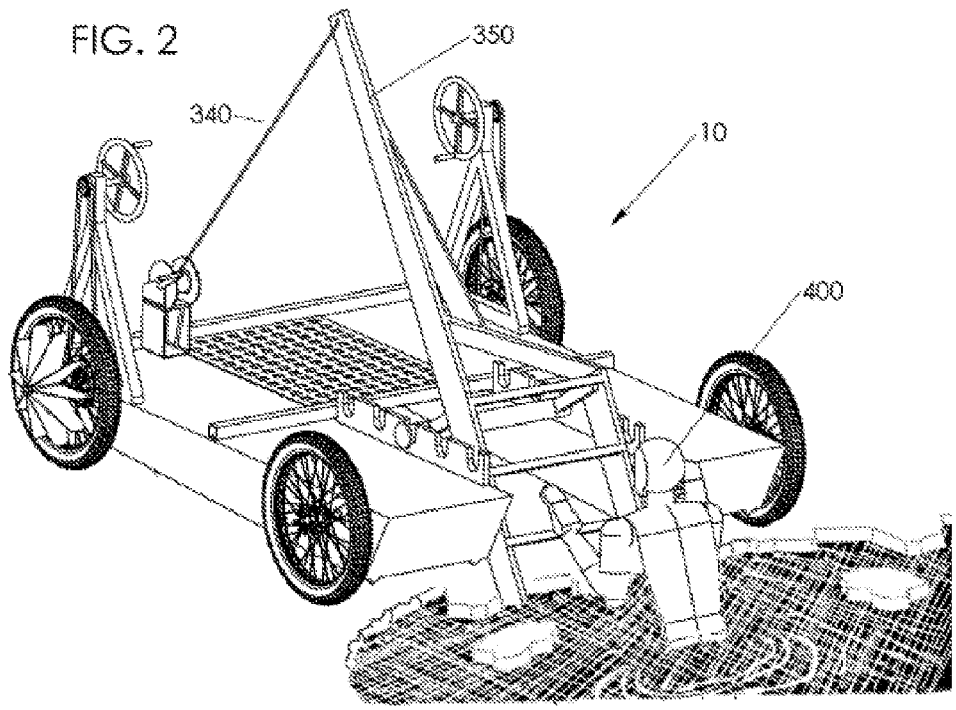
FIG. 2 is a front prospective view of the Ice Recovery Device in the retrieval position with a victim.
Figure 3:
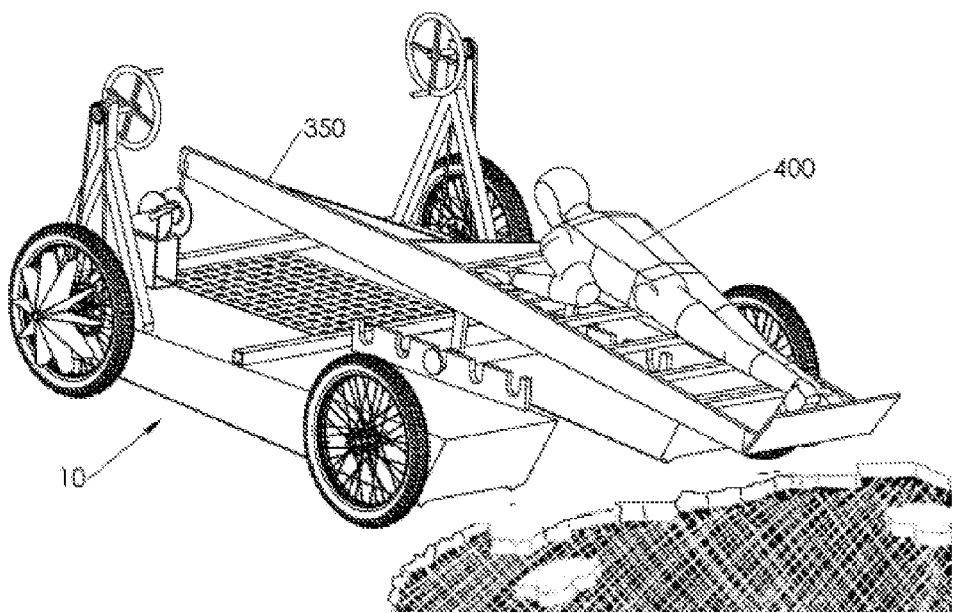
FIG. 3 is a front prospective view of the Ice Recovery Device in the recovery position with a victim.

FIG. 2 demonstrates the craft 10 with the ladder 350 in the rescue position demonstrating the cantilever effect of the ladder 350. The operator, not shown is this view releases the winch 330 allowing the connecting cable 340 to slacken, because the lower portion of the ladder is heavier than the top portion the ladder, the ladder will rotate downwards roughly 90 degrees or perpendicular to the deck of the craft 10 and into the water. This makes the ladder 350 accessible to the victim 400. As the victim 400 climbs up the ladder the center of gravity shifts causing the ladder to rotate towards a position parallel to the craft 10 and removing the victim 400 from the water. This allows a weakened submersed victim to be rescued easier because he can use the buoyant force of the water to aid his rescue, furthermore if the victim is injured or too weak to climb the ladder, all he has to do is hold on to a rung and the rescuer can exert a downward force on the top of the ladder to raise the victim out of the water as depicted in FIG. 3. In the current embodiment we contemplate a winch 330 and cable system or a block and tackle set up, but it is further contemplated that a simple handle can be affixed at the far end or top of the ladder 350 and pulled or pushed by the rescuer providing the proper mechanical advantage to rescue the victim.

Figure 4:
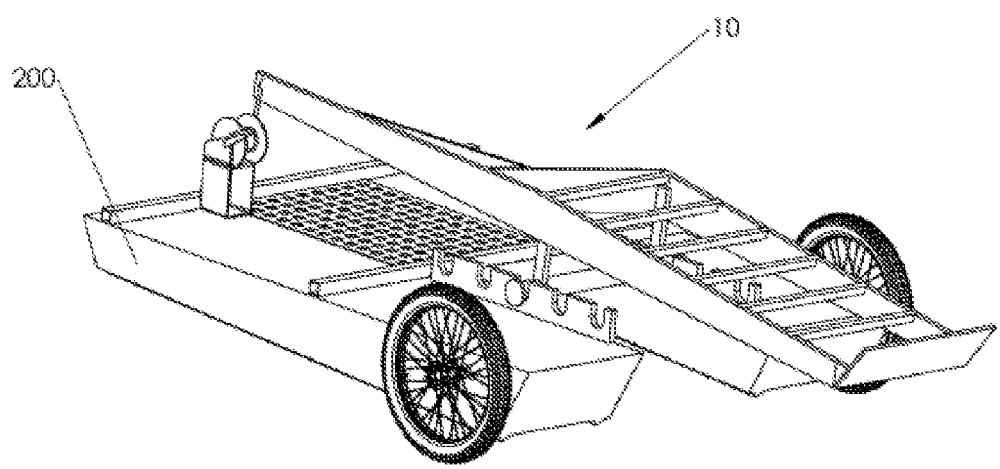
FIG. 4 is a front perspective view of an alternate embodiment of the Ice Recovery Device.
Figure 5:
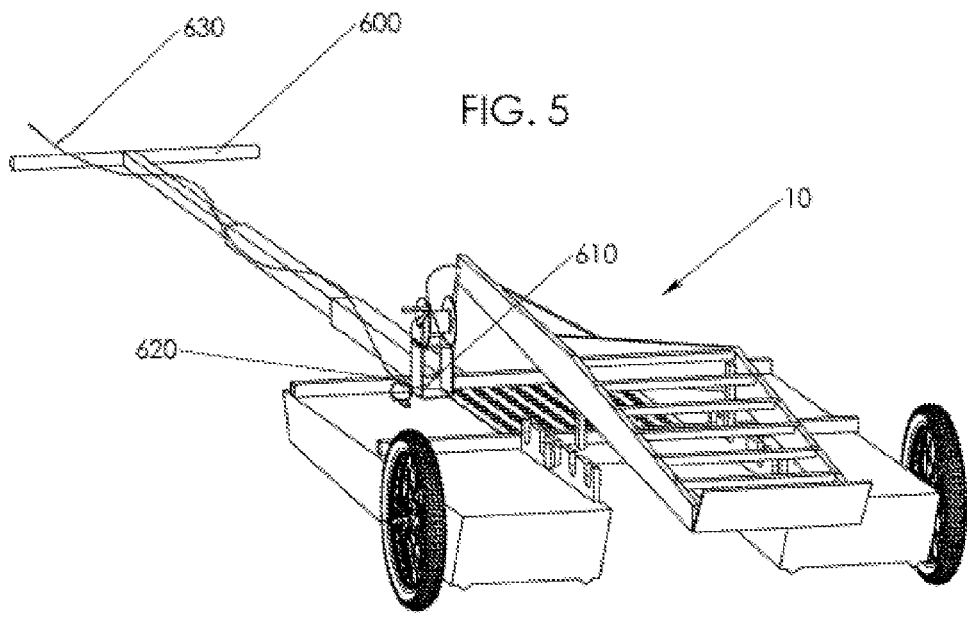
FIG. 5 is a front perspective view of another alternate embodiment of the Ice Recovery Device.

FIGS. 4 and 5 demonstrate an embodiment wherein the craft 10 can be propelled or operated from the shore by pushing it or steering it from land which would not require an operator to be on the craft. In this application the response time is greatly reduced because the rescuer does not have to don protective clothing, such as a dry suit to perform the rescue, furthermore there is less danger to the rescuer because he is in no danger of drowning. Also, the rescuer would not need extensive training to perform the rescue. The steering mechanism is a pole-like structure 610 with a proximate and a distal end with a handle 600 at the proximate end and the distal end attached to the craft 10. The handle 600 has been contemplated in some embodiments to be T-shaped. For storage and transportation considerations a locking telescoping pole structure 610 with a handle 600 is contemplated, so that the distance the craft can be maneuvered is limited by the length of the connecting rod 610. Although, the term telescoping pole has been used throughout the intent is to have an extendable rigid member to move the sled or device. In this embodiment the rotation of the ladder would be controlled by a cable or rope 630 that passes throw an eyelet 620 on the top of craft's deck and then along the pole structure towards the handle so that the operator can provide the force needed to retrieve the victim.

Figure 6:
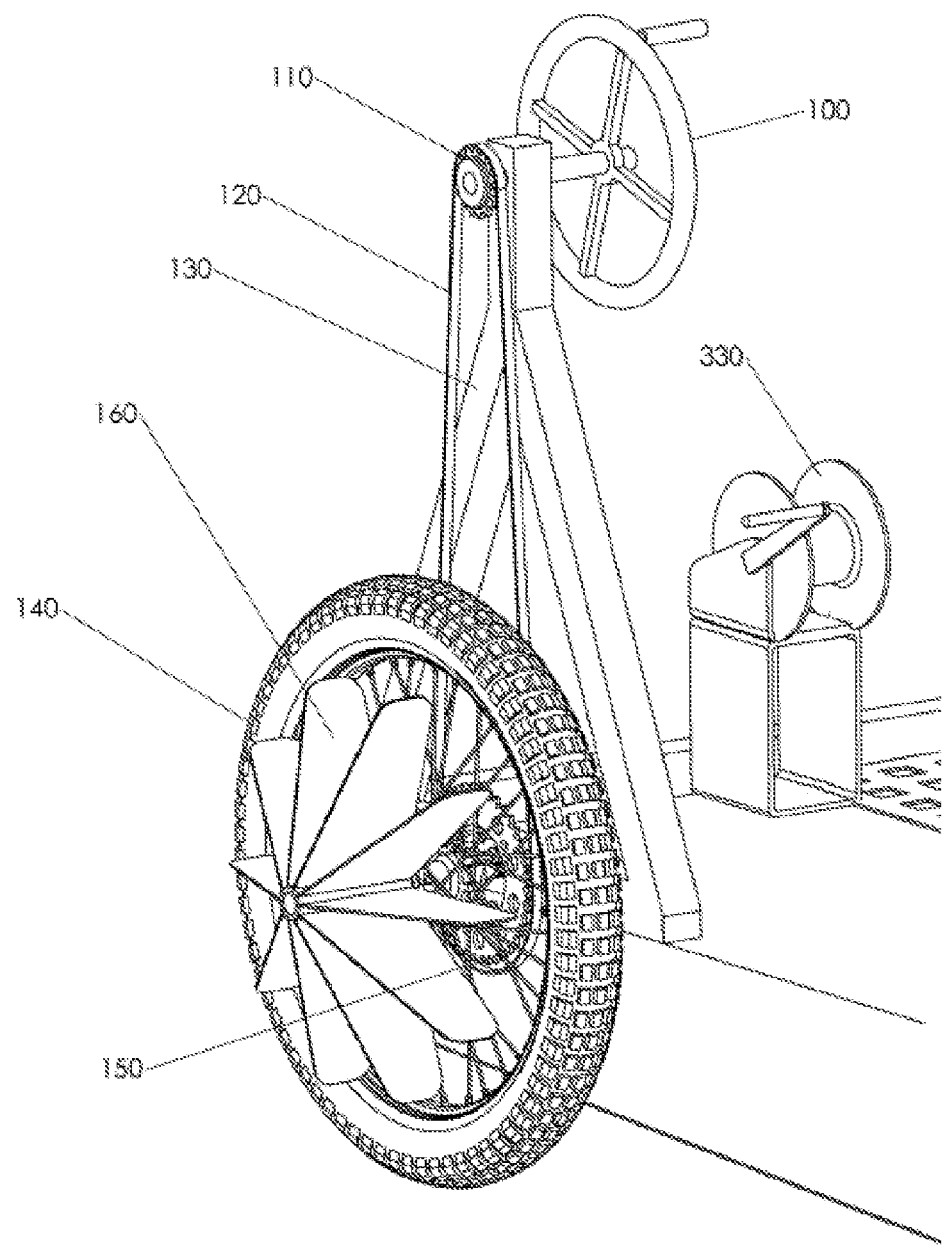
FIG. 6 is perspective view of the Ice Recovery Device drive wheel assembly.

FIG. 6 portrays a contemplated drive device of the rear wheels. The configuration is very similar to that of a bicycle, that is, there are two sprockets connected together with a chain. The upper sprocket 110 is mounted on a shaft or axle that is connected to a crank 100 or handle while the lower sprocket 150 is attached to the wheel 140 which has a serious of paddles or fins 160 connected to it radiating from its center, very similar to a paddle wheel, turbine, or propeller. Turning handle 100 rotates the wheel 140 and fins 160 which in turn propel the craft. The direction of the craft 10 can be controlled by rotating the two back wheels at different rates or even in different directions. This provides a simple failsafe method of propelling the vessel without the risk of losing oars or paddles or the need for motors or batteries to propel the boat. It has also been contemplated to add additional means of propelling the craft as aforementioned even though they may not be as reliable, they may have some merit.

Figure 7:
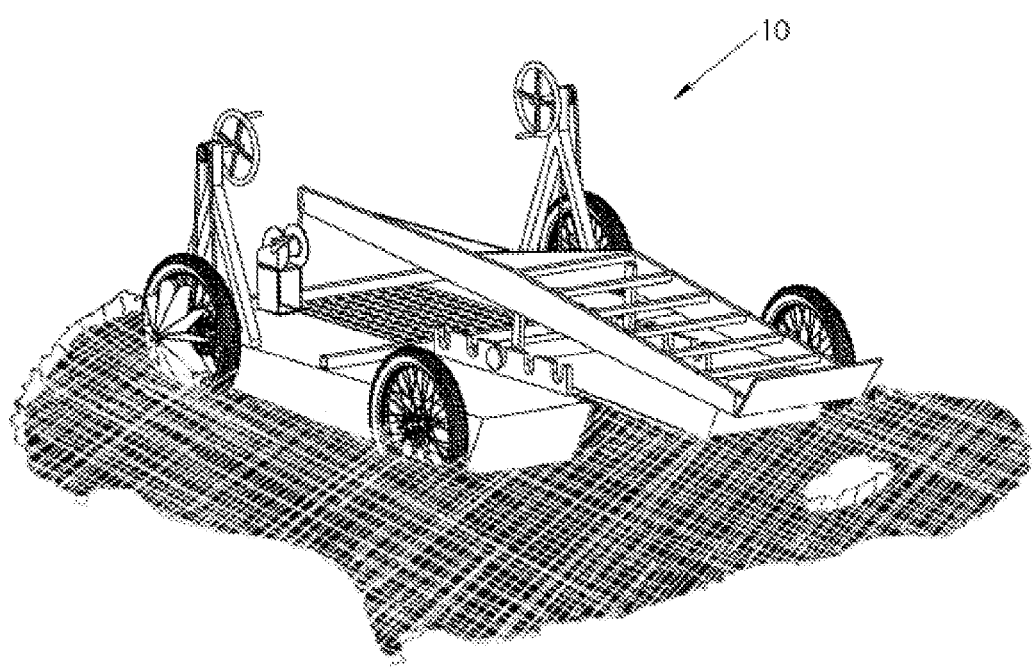
FIG. 7 is a front perspective view of the Ice Recovery Device driving/floating in water.

FIG. 7 portrays the craft 10 deployed in an ice/water environment to demonstrate the amphibious nature of the device 10.

Figure 8:
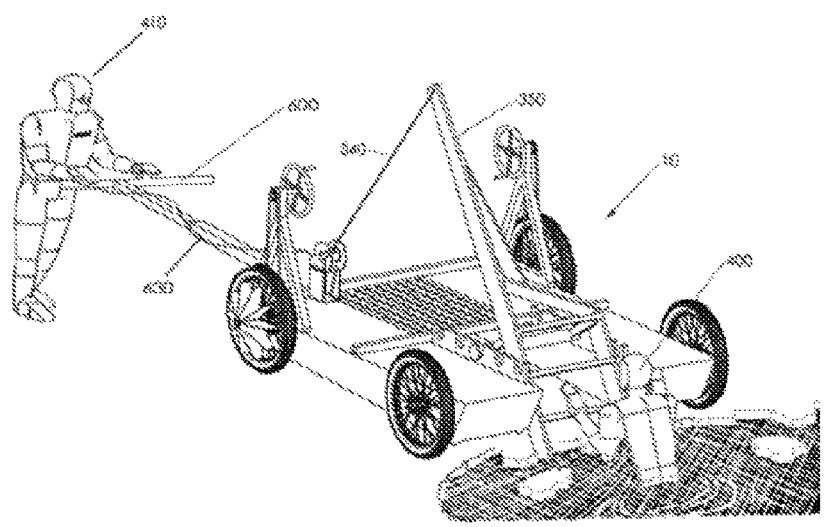
FIG. 8 is a front perspective view of the unmanned Ice Recovery Device being positioned towards victim.
Figure 9:
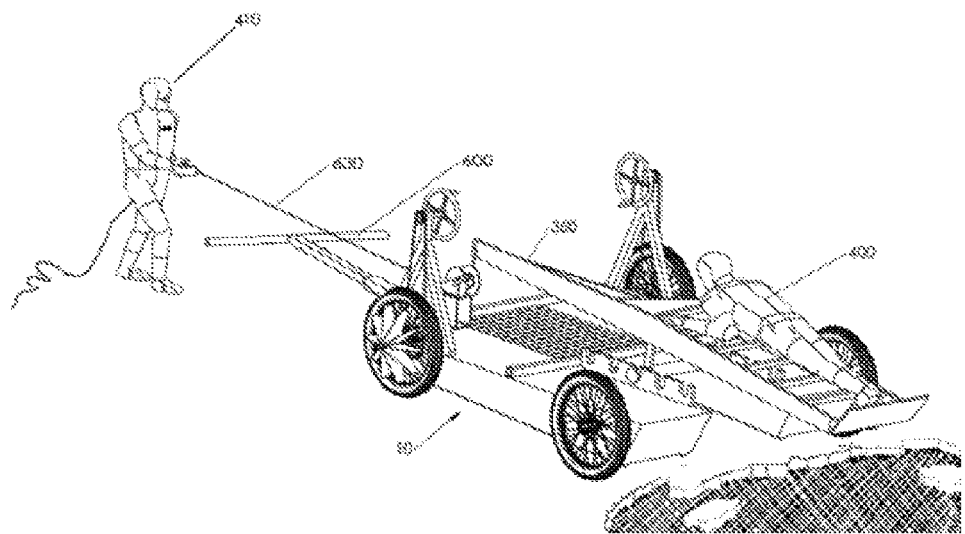
FIG. 9 is a front perspective view of the unmanned Ice Recovery Device recovering the victim

FIGS. 8 and 9 portray the craft 10 deployed in an unmanned scenario, whereby the rescuer 410 manipulates the handle 600 of the telescopic pole towards the victim and then recovers the victim from the water and then pulls the craft towards the shore or safe area by means of the rope, line or cable 630.

The invention has been described in terms of the preferred embodiment. One skilled in the art will recognize that it would be possible to construct the elements of the present invention from a variety of means and to modify the placement of the components in a variety of ways. While the embodiments of the invention have been described in detail and shown in the accompanying drawings, it will be evident that various further modifications are possible without departing from the scope of the invention as set forth in the following claims.

The invention claimed is:

1. A buoyant rescue craft comprising:
two pontoons interconnected by a connecting bar to form a catamaran structure with a bow and a stern with a void between the pontoons;
a ladder narrower than the void adjustably, pivotally affixed at a variety of points approximately the midpoint of the ladder to the catamaran structure approximately midway between the bow and the stern of the catamaran structure;
a quick release means of adjusting the pivot point of the ladder
a means of pivoting the ladder;
a deck structure bridging the rear void space of the pontoons;
an adjustable pivotally mounted ladder that is offset in the portion adjacent to the deck structure;
a ladder which is adjustably arranged to a variety of pivot points arranged on a pivot bar support;
a variety of pivot points is provided by pivot bar supports affixed to each pontoon arranged to be parallel;
at least one wheel mounted on the exterior side of each pontoon;
a means of propelling the craft comprising;
a wheel drive handle;
an upper sprocket;
a wheel drive support frame;
a lower sprocket;
a drive chain connecting the upper and lower sprocket;
fins radially mounted on the wheel; and
a telescoping pole with proximate and distal ends affixed to the craft at the distal end and terminating into a T-shaped handle at the proximate end.

* * * * *